United States Patent
Kumar et al.

(10) Patent No.: US 12,079,298 B2
(45) Date of Patent: Sep. 3, 2024

(54) METHODS AND SYSTEMS FOR BROWSER EXTENSION USED TO GENERATE RELATIVE XPATH, ABSOLUTE XPATH AND/OR CSS SELECTORS

(71) Applicant: Sauce Labs Inc., San Francisco, CA (US)

(72) Inventors: Sanjay Kumar, San Francisco, CA (US); Rajagopal Rao, San Francisco, CA (US)

(73) Assignee: Sauce Labs Inc., San Francisco, CA (US)

( * ) Notice: Subject to any disclaimer, the term of this patent is extended or adjusted under 35 U.S.C. 154(b) by 0 days.

(21) Appl. No.: 17/660,305

(22) Filed: Apr. 22, 2022

(65) Prior Publication Data

US 2022/0350857 A1 Nov. 3, 2022

Related U.S. Application Data

(63) Continuation of application No. 16/664,785, filed on Oct. 25, 2019, now abandoned.
(Continued)

(51) Int. Cl.
*G06F 40/143* (2020.01)
*G06F 3/0481* (2022.01)
(Continued)

(52) U.S. Cl.
CPC ........ *G06F 16/9574* (2019.01); *G06F 3/0481* (2013.01); *G06F 3/0485* (2013.01);
(Continued)

(58) Field of Classification Search
CPC .... G06F 16/986; G06F 40/143; G06F 3/0485; G06F 3/0481; G06F 8/61; G06F 9/44526
See application file for complete search history.

(56) References Cited

U.S. PATENT DOCUMENTS

| | | | |
|---|---|---|---|
| 10,789,328 B1 * | 9/2020 | Jadhav | H04L 63/168 |
| 2011/0184990 A1 * | 7/2011 | Murphy | G06F 8/30 707/791 |
| 2016/0140626 A1 | 5/2016 | Agarwal et al. | |
| 2017/0344227 A1 * | 11/2017 | Stoicov | H04L 41/22 |
| 2019/0034441 A1 * | 1/2019 | Capon | G06F 40/143 |
| 2019/0213224 A1 * | 7/2019 | Zhao | G06F 16/958 |

OTHER PUBLICATIONS

Kumar, Sanjay, ChroPath an Xpath Extension, Aug. 27, 2017, pp. 1-7 (Year: 2017).*

(Continued)

*Primary Examiner* — Ryan F Pitaro
(74) *Attorney, Agent, or Firm* — Weaver Austin Villeneuve & Sampson LLP (57) ABSTRACT

In one aspect, a computerized method useful for installing and managing a DevTool web-browser extension comprising: determining a web element selector using the DevTool web-browser extension; performing a specified action on a specified web element, wherein an address of the webpage element is ascertained using the specified selector output; with the DevTool web-browser extension, generating the address for specified web element automatically with a single click operation from a user into the web browser; with the address, generating a relative XPath selector, an absolute XPath selector or a Cascading Style Sheets (CSS) selector; and utilizing the DevTool web-browser extension as an editor tool for the relative XPath selector, the absolute XPath selector or the CSSs selector.

18 Claims, 5 Drawing Sheets

Related U.S. Application Data

(60) Provisional application No. 62/750,256, filed on Oct. 25, 2018.

(51) Int. Cl.
*G06F 3/0485* (2022.01)
*G06F 8/61* (2018.01)
*G06F 16/957* (2019.01)
*G06F 16/958* (2019.01)

(52) U.S. Cl.
CPC .............. *G06F 8/61* (2013.01); *G06F 16/986* (2019.01); *G06F 40/143* (2020.01)

(56) References Cited

OTHER PUBLICATIONS

Harsh, "How to Install and Use FireBug and FirePath in FireFox", 2016, pp. 1-8 (Year: 2016).*
Kumar, ChroPath 1.0, Youtube, May 1, 2017, https: www.youtube.com/watch?v=4Qhwtaf6TOE (Year: 2017).
U.S. Non-Final office Action dated Apr. 23, 2021 in U.S. Appl. No. 16/664,785.
U.S. Restriction Requirement dated Nov. 9, 2020 in U.S. Appl. No. 16/664,785.
U.S. Final office Action dated Dec. 24, 2021 in U.S. Appl. No. 16/664,785.
U.S. Appl. No. 18/169,678, inventor Rao., filed Feb. 15, 2023.

* cited by examiner

FIGURE 5

METHODS AND SYSTEMS FOR BROWSER EXTENSION USED TO GENERATE RELATIVE XPATH, ABSOLUTE XPATH AND/OR CSS SELECTORS

INCORPORATION BY REFERENCE

An Application Data Sheet is filed concurrently with this specification as part of the present application. Each application that the present application claims benefit of or priority to as identified in the concurrently filed Application Data sheet is incorporated by reference herein in its entirety and for all purposes.

BACKGROUND

Selectors (also known as locators) are the addresses of any of the web elements which you see in a web page like email/password box. XPath and CSS selectors are two different example types of selectors.

To perform any action on specified webpage elements, a user can obtain the relevant address of the webpage element. Currently, developers and testers are doing this manually. Obtaining the address using a manual technique can be cumbersome, error prone and consume a lot of time. Accordingly, improvement to generating these addresses in a more efficient and faster manner (e.g. automatically just with a single) are desired.

BRIEF SUMMARY OF THE INVENTION

In one aspect, a computerized method useful for installing and managing a DevTool web-browser extension comprising: determining a web element selector using the DevTool web-browser extension; performing a specified action on a specified web element, wherein an address of the webpage element is ascertained using the specified selector output; with the DevTool web-browser extension, generating the address for specified web element automatically with a single click operation from a user into the web browser; with the address, generating a relative XPath selector, an absolute XPath selector or a Cascading Style Sheets (CSS) selector; and utilizing the DevTool web-browser extension as an editor tool for the relative XPath selector, the absolute XPath selector or the CSSs selector.

BRIEF DESCRIPTION OF THE DRAWINGS

The Figures described above are a representative set and are not an exhaustive with respect to embodying the invention.

DESCRIPTION

Disclosed are a system, method, and article of manufacture of methods and systems for browser extension used to generate relative XPath, absolute XPath and/or CSS selectors. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Example Definitions and Example Algorithms

Application programming interface (API) can specify how software components of various systems interact with each other.

Cascading Style Sheets (CSS) is a style sheet language used for describing the presentation of a document written in a markup language like HTML.

DevTools can be a set of web developer tools built directly into a web browser.

Document Object Model (DOM) is a cross-platform and language-independent interface that treats an XML or HTML document as a tree structure wherein each node is an object representing a part of the document. The DOM represents a document with a logical tree. Each branch of the tree ends in a node, and each node contains objects. DOM methods allow programmatic access to the tree; with them one can change the structure, style or content of a document. Nodes can have event handlers attached to them. Once an event is triggered, the event handlers get executed.

Hypertext Markup Language (HTML) is the standard markup language for creating web pages and web applications.

Point and click (e.g. a 'click') can be a gesture made with a computer input device such as a mouse.

Selectors (also known as locators) can be an address of a web-page element. Example selectors can be XPath selectors and CSS selectors.

XPath (XML Path Language) is a query language for selecting nodes from an XML document.

Web development tools (DevTools) enable a web developer to test and debug relevant webpage code. Devtools can provide testing via a user interface of a website or web application.

Web page is a document that is suitable for the World Wide Web and web browsers. A web browser displays a web page on a monitor or mobile device.

Example Systems and Methods

Figure 1:
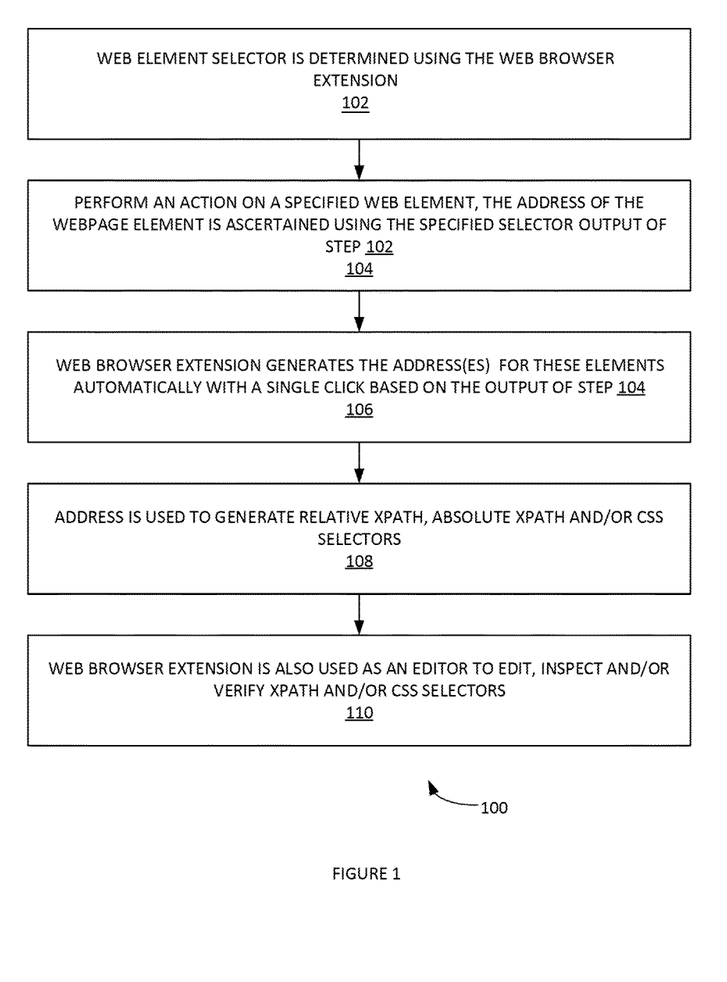
FIG. 1 illustrates an example process for installing and managing a DevTool web-browser extension, according to some embodiments.

FIG. 1 illustrates an example process 100 for installing and managing a DevTool web-browser extension, according to some embodiments. A DevTool web-browser extension (e.g. a ChroPath extension, etc.) is provided. In step 102, a web element selector is determined using the DevTool web-browser extension. As noted, a selectors is an address of any of the web elements which the uses may see in a web page. XPath and CSS selectors are two different types of selectors.

In step 104, to perform an action on a specified web element, the address of the webpage element is ascertained using the specified selector output of step 102. In step 106, the DevTool web-browser extension generates the address (es) for these elements automatically with a single click based on the output of step 104.

In step 108, the address is used to generate relative XPath, absolute XPath and/or CSS selectors. In step 110, the DevTool web-browser extension is also used as an editor to edit, inspect and/or verify XPath and/or CSS selectors (e.g. in a DevTools panel provided by the DevTool web-browser extension). Process 100 can be implemented in various web browsers such as, inter alia: Chrome®, Firefox®, etc.

Figure 2:
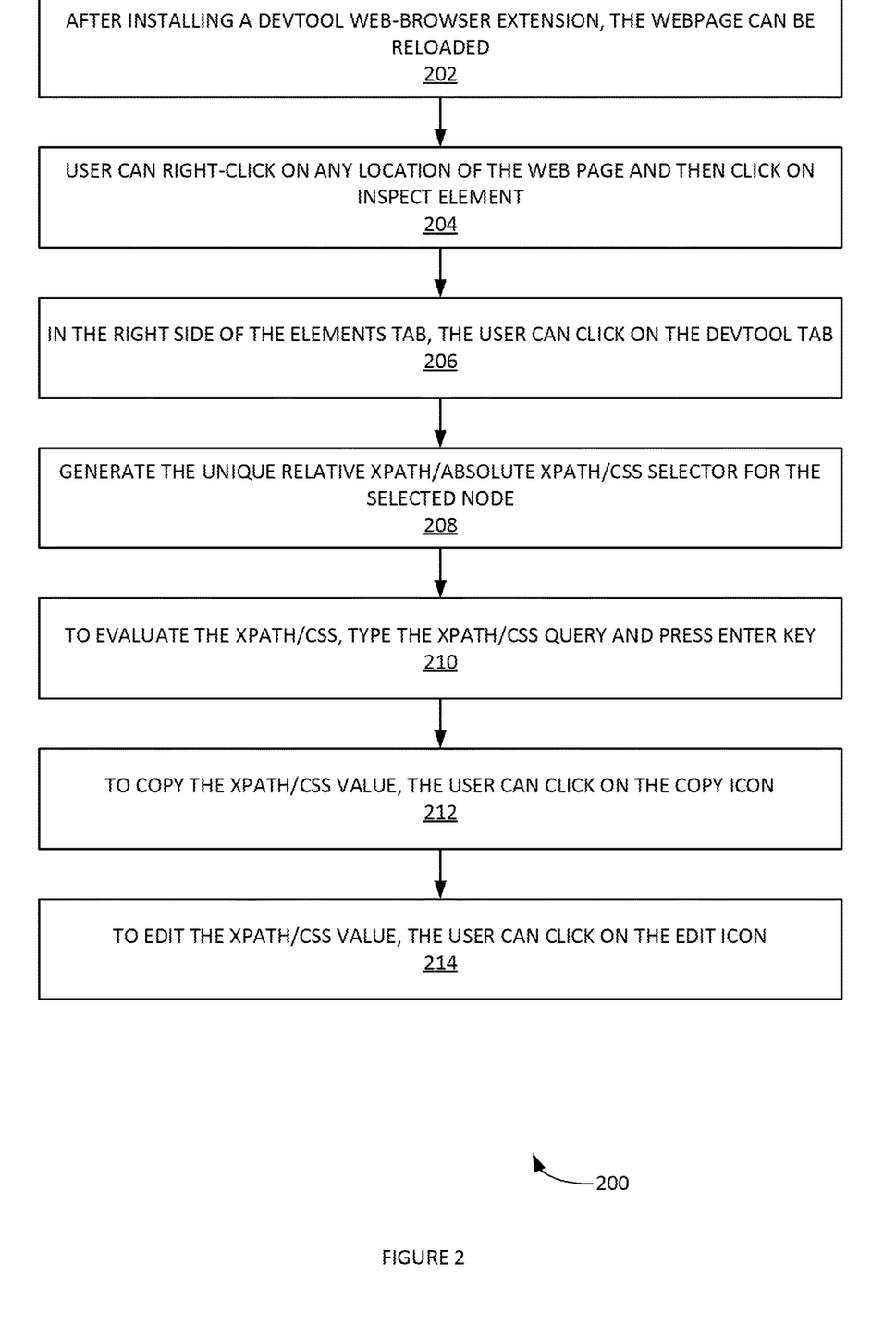
FIG. 2 illustrates an example process for using a DevTool web-browser extension, according to some embodiments.

FIG. 2 illustrates an example process 200 for using a DevTool web-browser extension, according to some embodiments. In step 202, after installing a DevTool web-browser extension (e.g. a ChroPath tab, etc.), the webpage can be reloaded. For example, a use can restart the Chrome® web browser. To use only one selector rel XPath/abs XPath/CSS features, change the dropdown value from selector to rel XPath/abs XPath/CSS in header.

In step 204, user can right-click on any location of the web page and then click on inspect element. The DevTool web-browser extension can add XPath/CSS attribute to all the matching node(s) as per their sequential occurrence. For example, a matching node appearing second in the list can have xpath=2 (and if verifying CSS then it can have css=2).

In step 206, in the right side of the elements tab, the user can click on the DevTool tab. It is noted that if the DevTool tab is not visible then the user can click on the arrow icon. The DevTool can be shown as last tab in sidebar.

In step 208, to generate XPath/CSS inspect element or click on any DOM node, process 200 can generate the unique relative XPath/absolute XPath/CSS selector for the selected node.

In step 210, to evaluate the XPath/CSS, type the XPath/CSS query and press enter key. For example, as the user enters, process 200 can query in DOM for the relevant element/node. The user can view the matching node(s) and nodes value as per their sequential occurrence. A dashed blue outline appears around to highlight the matching elements in the web page. In step 212, to copy the XPath/CSS value, the user can click on the copy icon. In step 214, to edit the XPath/CSS value, the user can click on the edit icon.

Figure 3:
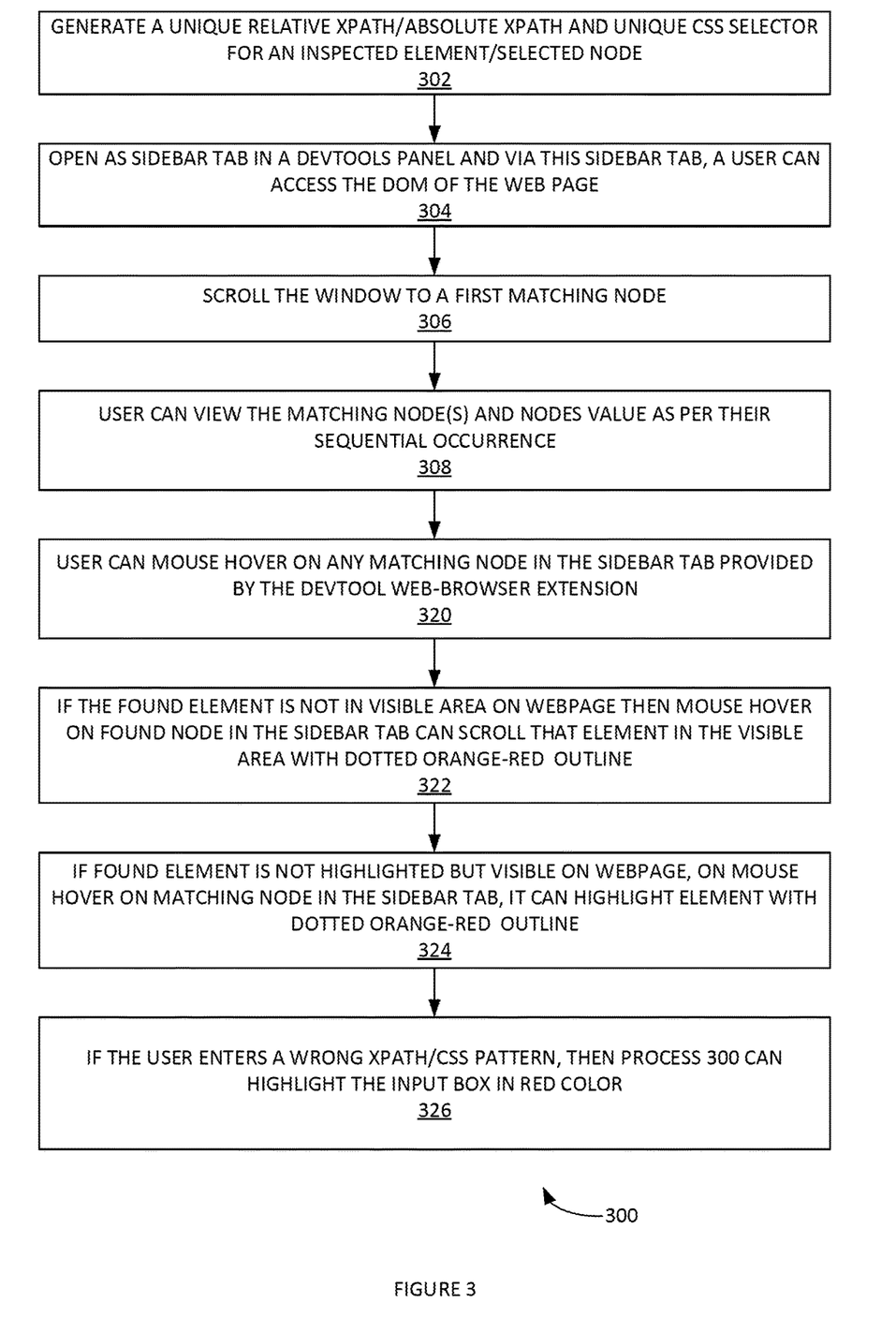
FIG. 3 illustrates an example process for implementing a DevTool web-browser extension, according to some embodiments.

FIG. 3 illustrates an example process 300 for implementing a DevTool web-browser extension, according to some embodiments. In step 302, process 300 can generate a unique relative XPath/absolute XPath and unique CSS selector for an inspected element/selected node.

In step 304, process 300 can open as sidebar tab in a DevTools panel. Via this sidebar tab, a user can access the DOM of the web page. The user can inspect element(s) in an elements tab. The user can write the XPath/CSS in the sidebar tab provided by the DevTool web-browser extension (e.g. a ChroPath tab, etc.) and/or evaluate said elements.

In step 306, process 300 can scroll the window to a first matching node. For example, scrolling can be implemented when a first matching element not in a visible area. In step 308, the user can view the matching node(s) and nodes value as per their sequential occurrence. A dashed blue outline can appear around to highlight all the matching elements in the web page.

In step 310, the user can mouse hover on any matching node in the sidebar tab provided by the DevTool web-browser extension. For example, the blue dashed outline can convert into dotted orange-red to highlight the corresponding element in the webpage.

In step 312, if the found element is not in visible area on webpage then mouse hover on found node in the sidebar tab can scroll that element in the visible area with dotted orange-red outline. In step 314, if found element is not highlighted but visible on webpage, on mouse hover on matching node in the sidebar tab, it can highlight element with dotted orange-red outline. In steps 316, if the user enters a wrong XPath/CSS pattern, then process 300 can highlight the input box in red color.

It is noted that various open-source APIs can be used herein. Example, API's include, inter alia, Chrome® API(s), Firefox® API(s), etc. In one example, embodiment, the logic and functionalities of the systems and processes provided herein can be written in Java Script®.

Another example method is now provided. A selector (e.g. relative XPath, absolute XPath, CSS etc.) can be copied from a context menu by right clicking on the element and clicking on copy. The selectors for the element can be inside an iframe. A list of all selectors along with their name in CSV/JSON file can be obtained. More selectors (e.g. linkText, partiallinkText, id, name, className, tagName, etc.) can be obtained. The method can then auto-suggest XPath in editor for the relevant XPath. The method can scroll the matching node in DOM, as well as, on pressing enter key and on mouse hovering on matching node in a chropath tab. The method can display the selector with the mouse hovering on any element when the inspector is active. The method can create a shortcut to open chropath tab.

Example Systems

Figure 4:
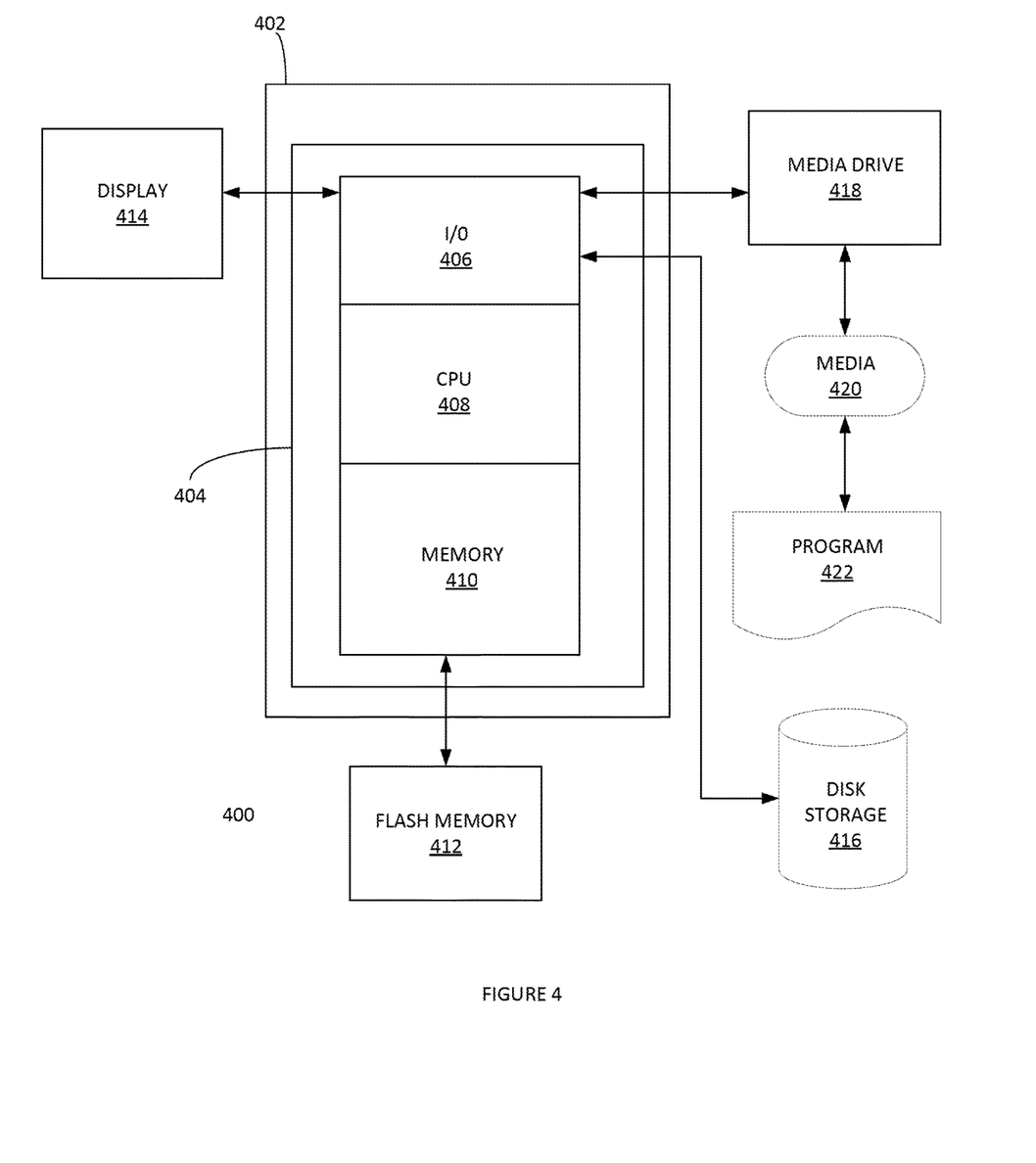
FIG. 4 depicts computing system with a number of components that may be used to perform any of the processes described herein.

FIG. 4 depicts computing system 400 with a number of components that may be used to perform any of the processes described herein. The main system 402 includes a motherboard 404 having an I/O section 406, one or more central processing units (CPU) 408, and a memory section 410, which may have a flash memory card 412 related to it. The I/O section 406 can be connected to a display 414, a keyboard and/or other user input (not shown), a disk storage unit 416, and a media drive unit 418. The media drive unit 418 can read/write a computer-readable medium 420, which can contain programs 422 and/or data. Computing system 400 can include a web browser. Moreover, it is noted that computing system 400 can be configured to include additional systems in order to fulfill various functionalities. Computing system 400 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 5:
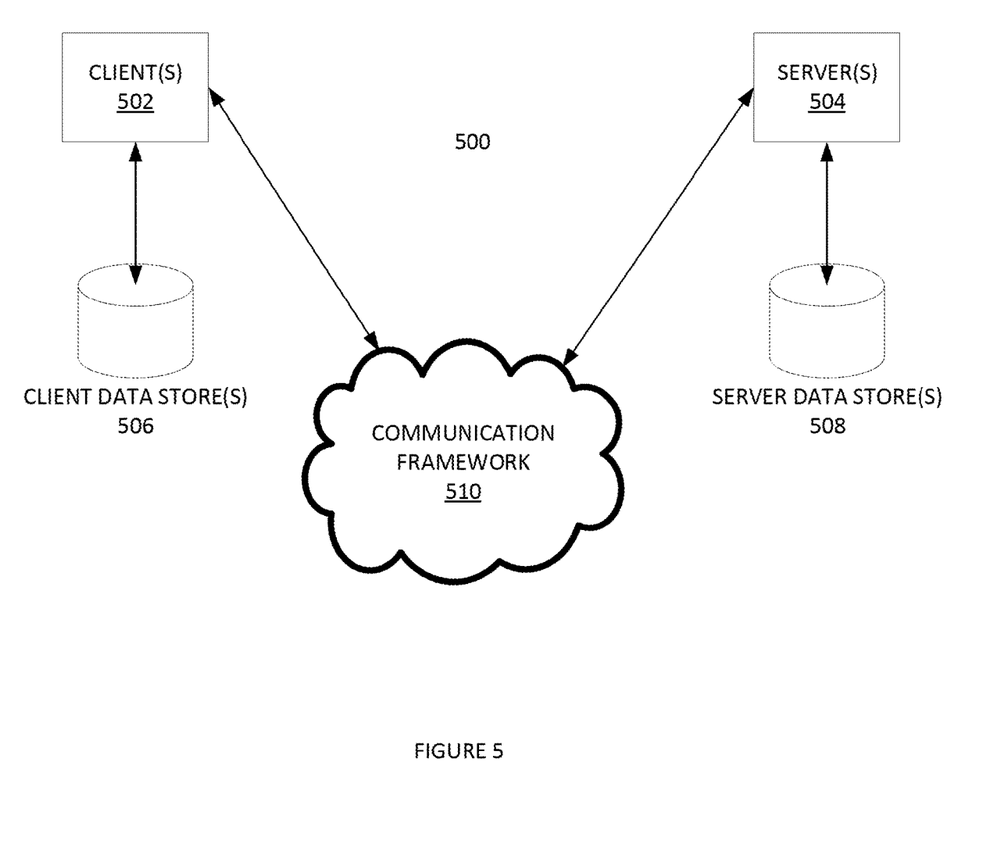
FIG. 5 is a block diagram of a sample-computing environment that can be utilized to implement various embodiments.

FIG. 5 is a block diagram of a sample-computing environment 500 that can be utilized to implement various embodiments. The system 500 further illustrates a system that includes one or more client(s) 502. The client(s) 502 can be hardware and/or software (e.g., threads, processes, computing devices). The system 500 also includes one or more server(s) 504. The server(s) 504 can also be hardware and/or software (e.g., threads, processes, computing devices). One possible communication between a client 502 and a server 504 may be in the form of a data packet adapted to be transmitted between two or more computer processes. The system 500 includes a communication framework 510 that can be employed to facilitate communications between the client(s) 502 and the server(s) 504. The client(s) 502 are connected to one or more client data store(s) 506 that can be employed to store information local to the client(s) 502. Similarly, the server(s) 504 are connected to one or more server data store(s) 508 that can be employed to store information local to the server(s) 504. In some embodiments, system 500 can instead be a collection of remote computing services constituting a cloud-computing platform.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g. embodied in a machine-readable medium).

In addition, it can be appreciated that the various operations, processes, and methods disclosed herein can be embodied in a machine-readable medium and/or a machine accessible medium compatible with a data processing system (e.g. a computer system) and can be performed in any order (e.g. including using means for achieving the various operations). Accordingly, the specification and drawings are to be regarded in an illustrative rather than a restrictive sense. In some embodiments, the machine-readable medium can be a non-transitory form of machine-readable medium.

The invention claimed is:

1. A method, comprising:
receiving a first selector pattern through a web-browser extension, wherein the first selector pattern is an XPath selector pattern or a Cascading Style Sheets (CSS) selector pattern;
searching a Document Object Model (DOM) of a webpage to locate one or more matching nodes that satisfy the first selector pattern;
presenting the one or more matching nodes in a first window associated with the web-browser extension;
receiving a first user input after presenting the one or more matching nodes, wherein the first user input identifies a web element associated with a first node among the one or more matching nodes;
generating at least one selector for the web element in response to the first user input, wherein the at least one selector comprises a relative XPath selector, and wherein generating the at least one selector comprises determining, by a computer executing the web-browser extension, a pattern of the relative XPath selector;
presenting the at least one selector through the web-browser extension; and
copying the at least one selector in response to a second user input, the second user input being received after the at least one selector has been presented.

2. The method of claim 1, wherein the at least one selector further comprises at least one of an absolute XPath selector or a CSS selector.

3. The method of claim 1, wherein the first user input is applied to a graphical representation of the web element as displayed on the webpage.

4. The method of claim 1, wherein the first user input is applied to the first node.

5. The method of claim 1, further comprising:
presenting the DOM in a second window, wherein the first window and the second window correspond to separate tabs in a sidebar of a web browser.

6. The method of claim 1, wherein the one or more matching nodes include the first node and a second node, and wherein presenting the one or more matching nodes in the first window comprises:
presenting the first node and the second node in order of their occurrence in the DOM.

7. The method of claim 1, wherein the first selector pattern is an XPath selector pattern different from the pattern of the relative XPath selector.

8. The method of claim 1, wherein the second user input comprises right clicking on the relative XPath selector and clicking a copy option.

9. The method of claim 1, further comprising:
presenting, via the web-browser extension, an option to edit the at least one selector after the at least one selector has been copied.

10. A computer system, comprising:
memory in which a web-browser extension has been installed; and
one or more processing units configured to, in connection with executing the web-browser extension:
receive a first selector pattern through the web-browser extension, wherein the first selector pattern is an XPath selector pattern or a Cascading Style Sheets (CSS) selector pattern;
search a Document Object Model (DOM) of a webpage to locate one or more matching nodes that satisfy the first selector pattern;

present the one or more matching nodes in a first window associated with the web-browser extension;

receive a first user input after presenting the one or more matching nodes, wherein the first user input identifies a web element associated with a first node among the one or more matching nodes;

generate at least one selector for the web element in response to the first user input, wherein the at least one selector comprises a relative XPath selector, and wherein to generate the at least one selector, the one or more processing units are configured to determine a pattern of the relative XPath selector;

present the at least one selector through the web-browser extension; and copy the at least one selector in response to a second user input, the second user input being received after the at least one selector has been presented.

11. The computer system of claim 10, wherein the at least one selector further comprises at least one of an absolute XPath selector or a CSS selector.

12. The computer system of claim 10, wherein the first user input is applied to a graphical representation of the web element as displayed on the webpage.

13. The computer system of claim 10, wherein the first user input is applied to the first node.

14. The computer system of claim 13, wherein the one or more processing units are further configured to:

present the DOM in a second window, wherein the first window and the second window correspond to separate tabs in a sidebar of a web browser.

15. The computer system of claim 10, wherein:

the one or more matching nodes include the first node and a second node; and the one or more processing units are further configured to, as part of presenting the one or more matching nodes in the first window, present the first node and the second node in order of their occurrence in the DOM.

16. The computer system of claim 10, wherein the first selector pattern is an XPath selector pattern different from the pattern of the relative XPath selector.

17. The computer system of claim 10, wherein the second user input comprises right clicking on the relative XPath selector and clicking a copy option.

18. The computer system of claim 10, wherein the one or more processing units are further configured to present, via the web-browser extension, an option to edit the at least one selector after the at least one selector has been copied.

* * * * *